US008478300B2

(12) United States Patent
Kuehnel et al.

(10) Patent No.: US 8,478,300 B2
(45) Date of Patent: Jul. 2, 2013

(54) PROXIMITY SERVICE DISCOVERY IN WIRELESS NETWORKS

(75) Inventors: Thomas W. Kuehnel, Seattle, WA (US); Abhishek Abhishek, Woodinville, WA (US); Amer A. Hassan, Kirkland, WA (US); David Jones, Seattle, WA (US); Francis Duong, Bellevue, WA (US); Hui Shen, Issaquah, WA (US); Jiandong Ruan, Sammamish, WA (US); Sean O. Lyndersay, Seattle, WA (US); Srinivas R. Gatta, Redmond, WA (US); Vishesh M. Parikh, Redmond, WA (US); Yi Lu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 3829 days.

(21) Appl. No.: 11/313,148

(22) Filed: Dec. 20, 2005

(65) Prior Publication Data

US 2007/0141986 A1 Jun. 21, 2007

(51) Int. Cl.
*H04W 24/00* (2009.01)
*H04B 7/00* (2006.01)
*H04L 12/28* (2006.01)

(52) U.S. Cl.
USPC .................. 455/456.3; 455/41.2; 370/395.2; 370/395.32

(58) Field of Classification Search
USPC .......................................... 455/41.2; 370/338
See application file for complete search history.

(56) References Cited

U.S. PATENT DOCUMENTS

| 5,724,588 | A | 3/1998 | Atkinson et al. |
| 5,850,444 | A | 12/1998 | Rune |
| 6,002,941 | A | 12/1999 | Ablay et al. .................. 455/518 |
| 6,282,183 | B1 | 8/2001 | Harris et al. |
| 6,353,398 | B1 | 3/2002 | Amin et al. |
| 6,452,498 | B2 | 9/2002 | Stewart |
| 6,532,368 | B1 | 3/2003 | Hild et al. |
| 6,633,757 | B1 | 10/2003 | Hermann et al. |
| 6,659,947 | B1 | 12/2003 | Carter et al. |
| 6,728,232 | B2 | 4/2004 | Hasty, Jr. et al. |
| 6,763,014 | B2 | 7/2004 | Kennedy |

(Continued)

FOREIGN PATENT DOCUMENTS

| CN | 1389055 | 1/2003 |
| CN | 1585336 A | 2/2005 |

(Continued)

OTHER PUBLICATIONS

International Search Report for International application No. PCT/US2007/011636, mailed Dec. 20, 2007.

(Continued)

*Primary Examiner* — Huy C Ho
(74) *Attorney, Agent, or Firm* — Merchant & Gould P.C.

(57) ABSTRACT

Discovery of services between devices is provided prior to establishing a connection between devices, including wireless-enabled devices or devices that are communicatively coupled to wireless access points or other wireless communication devices. Discovering services prior to establishing a connection may facilitate finding a desired service. The services that may be discovered may be, for example, print services, camera services, PDA services or any other suitable services. Services may be discovered using 802.11, UWB or any other suitable wireless technology. As one example, particular services may be requested. As another example, services that are provided by a device may be advertised.

20 Claims, 6 Drawing Sheets

U.S. PATENT DOCUMENTS

| | | |
|---|---|---|
| 6,842,460 B1 | 1/2005 | Olkkonen et al. |
| 6,862,737 B1 | 3/2005 | Iwamura et al. |
| 6,892,052 B2 | 5/2005 | Kotola et al. |
| 6,909,706 B2 | 6/2005 | Wilmer et al. |
| 6,909,721 B2 | 6/2005 | Ekberg et al. |
| 6,952,715 B1 | 10/2005 | Kronz |
| 6,957,086 B2 | 10/2005 | Bahl et al. |
| 6,961,560 B2 | 11/2005 | Hermann et al. |
| 6,966,714 B2 | 11/2005 | Harris et al. |
| 6,993,326 B2 | 1/2006 | Link |
| 7,024,552 B1 | 4/2006 | Caswell et al. |
| 7,046,647 B2 | 5/2006 | Oba et al. |
| 7,054,627 B1 | 5/2006 | Hillman |
| 7,120,420 B2 | 10/2006 | Karagouz et al. |
| 7,130,289 B2 | 10/2006 | Kuan et al. |
| 7,155,167 B1 | 12/2006 | Cmiy |
| 7,233,991 B2 | 6/2007 | Adhikari |
| 7,243,233 B2 | 7/2007 | Kindberg et al. |
| 7,269,260 B2 | 9/2007 | Adachi et al. |
| 7,313,111 B2 | 12/2007 | Hietalahti et al. |
| 7,359,363 B2 | 4/2008 | Sakai |
| 7,359,989 B2 | 4/2008 | Orava et al. |
| 7,366,511 B2 | 4/2008 | Jaakkola et al. |
| 7,370,362 B2 | 5/2008 | Olson et al. |
| 7,403,512 B2 | 7/2008 | Tsai et al. ............... 370/338 |
| 7,412,518 B1 | 8/2008 | Duigou et al. |
| 7,421,582 B2 | 9/2008 | Fu et al. |
| 7,477,746 B2 | 1/2009 | Kang et al. |
| 7,505,443 B2 | 3/2009 | McNew et al. |
| 7,505,595 B2 | 3/2009 | Lee et al. |
| 7,617,317 B2 | 11/2009 | Jones et al. |
| 7,680,494 B2 | 3/2010 | Karaoguz et al. |
| 7,861,283 B2 | 12/2010 | Kobayashi |
| 7,903,646 B2 | 3/2011 | Ikeda |
| 2001/0010689 A1 | 8/2001 | Awater et al. |
| 2001/0041568 A1 | 11/2001 | Hughes et al. |
| 2002/0032746 A1 | 3/2002 | Lararidis |
| 2002/0083121 A1 | 6/2002 | Chang et al. |
| 2002/0120750 A1 | 8/2002 | Nidd |
| 2002/0160817 A1 | 10/2002 | Salmimaa et al. ......... 455/566 |
| 2002/0176579 A1 | 11/2002 | Deshpande et al. |
| 2003/0009758 A1 | 1/2003 | Townsend et al. ......... 725/39 |
| 2003/0045280 A1 | 3/2003 | Simons |
| 2003/0065851 A1 | 4/2003 | Layman |
| 2003/0100315 A1 | 5/2003 | Rankin |
| 2003/0158922 A1 | 8/2003 | Park |
| 2003/0196115 A1 | 10/2003 | Karp |
| 2003/0208595 A1 | 11/2003 | Gouge et al. |
| 2003/0217289 A1 | 11/2003 | Walker |
| 2003/0223424 A1* | 12/2003 | Anderson et al. .......... 370/392 |
| 2003/0228842 A1 | 12/2003 | Heinonen et al. |
| 2004/0006705 A1 | 1/2004 | Walker |
| 2004/0009769 A1 | 1/2004 | Yokoyama |
| 2004/0023640 A1 | 2/2004 | Ballai |
| 2004/0066756 A1 | 4/2004 | Ahmavaara et al. |
| 2004/0068653 A1 | 4/2004 | Fascenda |
| 2004/0076279 A1 | 4/2004 | Taschereau |
| 2004/0077336 A1 | 4/2004 | Lauriol |
| 2004/0087274 A1* | 5/2004 | Ekberg et al. ............... 455/41.2 |
| 2004/0102215 A1 | 5/2004 | Karr et al. |
| 2004/0106408 A1 | 6/2004 | Beasley et al. |
| 2004/0152416 A1 | 8/2004 | Dahl |
| 2004/0170134 A1 | 9/2004 | Furuyama et al. |
| 2004/0176117 A1 | 9/2004 | Strittmatter et al. |
| 2004/0203890 A1 | 10/2004 | Karaoguz et al. |
| 2004/0208151 A1 | 10/2004 | Haverinen et al. |
| 2004/0213409 A1 | 10/2004 | Murto et al. |
| 2004/0246983 A1 | 12/2004 | Kaatz |
| 2004/0253948 A1 | 12/2004 | Laberteaux |
| 2005/0021725 A1 | 1/2005 | Lobbert |
| 2005/0032556 A1 | 2/2005 | Bennett et al. |
| 2005/0041634 A1 | 2/2005 | Aura |
| 2005/0058109 A1 | 3/2005 | Ekberg |
| 2005/0078644 A1 | 4/2005 | Tsai, Jr. et al. |
| 2005/0083929 A1 | 4/2005 | Salo et al. |
| 2005/0096047 A1 | 5/2005 | Haberman et al. |
| 2005/0099985 A1 | 5/2005 | Callaway et al. |
| 2005/0128958 A1 | 6/2005 | Hamdan |
| 2005/0147073 A1 | 7/2005 | Hietalahti et al. |
| 2005/0164678 A1 | 7/2005 | Rezvani et al. |
| 2005/0176420 A1 | 8/2005 | Graves et al. |
| 2005/0185660 A1 | 8/2005 | Ekberg et al. |
| 2005/0186949 A1 | 8/2005 | Ho |
| 2005/0193106 A1 | 9/2005 | Desai et al. |
| 2005/0197136 A1 | 9/2005 | Friday et al. ............... 455/456.1 |
| 2005/0232242 A1 | 10/2005 | Karaguz et al. |
| 2005/0255839 A1 | 11/2005 | Perttila |
| 2005/0255844 A1 | 11/2005 | Sugaya et al. |
| 2005/0260972 A1 | 11/2005 | Karaoguz et al. |
| 2005/0282556 A1 | 12/2005 | Morris |
| 2006/0004456 A1 | 1/2006 | McKay .................... 623/17.16 |
| 2006/0030265 A1 | 2/2006 | Desai et al. |
| 2006/0034256 A1 | 2/2006 | Addahatla et al. |
| 2006/0036517 A1 | 2/2006 | Walter |
| 2006/0039337 A1 | 2/2006 | Hodoshima |
| 2006/0047835 A1 | 3/2006 | Greaux |
| 2006/0078123 A1 | 4/2006 | Bichot et al. |
| 2006/0089138 A1 | 4/2006 | Smith et al. |
| 2006/0126579 A1 | 6/2006 | Kim et al. |
| 2006/0133414 A1 | 6/2006 | Luoma et al. |
| 2006/0153151 A1 | 7/2006 | Huang et al. ................ 370/338 |
| 2006/0187889 A1 | 8/2006 | Mehta et al. |
| 2006/0189298 A1 | 8/2006 | Marcelli |
| 2006/0209773 A1 | 9/2006 | Hundal et al. |
| 2006/0217131 A1 | 9/2006 | Alizadeh-Shabdiz et al. |
| 2006/0223527 A1 | 10/2006 | Lee et al. |
| 2006/0227972 A1 | 10/2006 | Brok et al. |
| 2006/0253559 A1 | 11/2006 | Espina Perez et al. |
| 2006/0262932 A1 | 11/2006 | Sood et al. .................. 380/272 |
| 2006/0268896 A1 | 11/2006 | Kotola et al. ................ 370/400 |
| 2006/0282514 A1 | 12/2006 | Saint-Hilaire et al. |
| 2007/0006098 A1 | 1/2007 | Krumml et al. |
| 2007/0025371 A1 | 2/2007 | Krantz |
| 2007/0026856 A1 | 2/2007 | Krantz et al. |
| 2007/0032219 A1 | 2/2007 | Rudolf et al. |
| 2007/0036119 A1 | 2/2007 | Haddad et al. ............... 370/338 |
| 2007/0097904 A1 | 5/2007 | Mukherjee et al. |
| 2007/0117548 A1 | 5/2007 | Fernandex-Alonso et al. ........................ 455/414.1 |
| 2007/0118587 A1 | 5/2007 | Ishikawa et al. |
| 2007/0123260 A1 | 5/2007 | Kim et al. |
| 2007/0140214 A1 | 6/2007 | Zoltan |
| 2007/0141984 A1 | 6/2007 | Kuehnel |
| 2007/0141986 A1 | 6/2007 | Kuehnel |
| 2007/0141988 A1 | 6/2007 | Kuehnel |
| 2007/0147313 A1 | 6/2007 | Braam et al. |
| 2007/0147324 A1 | 6/2007 | McGray |
| 2007/0150570 A1 | 6/2007 | Eastham et al. |
| 2007/0218875 A1 | 9/2007 | Calhoun et al. |
| 2007/0242643 A1 | 10/2007 | Chandra et al. |
| 2007/0264968 A1 | 11/2007 | Frank et al. |
| 2007/0264974 A1 | 11/2007 | Frank et al. |
| 2007/0264991 A1 | 11/2007 | Jones et al. |
| 2008/0261574 A1 | 10/2008 | Rinta-Aho et al. ......... 455/414.3 |
| 2008/0261591 A1 | 10/2008 | Laumen et al. ............ 455/435.1 |
| 2008/0276303 A1 | 11/2008 | Gast |
| 2008/0285670 A1 | 11/2008 | Walton et al. |
| 2009/0031398 A1 | 1/2009 | Zheg et al. |
| 2009/0094111 A1 | 4/2009 | Wu |
| 2009/0214036 A1 | 8/2009 | Shen |
| 2012/0022948 A1 | 1/2012 | Jones et al. |

FOREIGN PATENT DOCUMENTS

| | | |
|---|---|---|
| CN | 1757195 | 4/2006 |
| EP | 1 227 689 A1 | 7/2002 |
| EP | 1220552 | 7/2002 |
| EP | 1253539 | 10/2002 |
| EP | 1298847 | 4/2003 |
| EP | 1370050 | 10/2003 |
| EP | 1 494 394 A1 | 1/2005 |
| EP | 1 727 310 A1 | 11/2006 |
| EP | 1760654 | 3/2007 |
| JP | 2001-298467 | 10/2001 |
| JP | 2001/298467 A | 10/2001 |
| JP | 2002-502568 | 1/2002 |
| JP | 2003-258808 | 9/2003 |
| JP | 2003/258808 A2 | 9/2003 |

| | | |
|---|---|---|
| JP | 2004179872 | 6/2004 |
| JP | 2004235976 | 8/2004 |
| JP | 2004-248072 | 9/2004 |
| JP | 2004254311 | 9/2004 |
| JP | 2005-328231 | 11/2005 |
| JP | 2005/328231 A | 11/2005 |
| KR | 1999/023310 A | 3/1999 |
| KR | 19991023310 | 3/1999 |
| KR | 20000017730 | 4/2000 |
| KR | 20060002649 | 1/2006 |
| RU | 2005129108 | 1/2006 |
| WO | WO 01/86486 * | 11/2001 |
| WO | WO 01/86486 A3 | 11/2001 |
| WO | WO 03/081373 A2 | 10/2003 |
| WO | 2004004918 | 1/2004 |
| WO | 2004/086667 | 10/2004 |
| WO | WO 2004/086667 A2 | 10/2004 |
| WO | WO 2004086667 A2 | 10/2004 |
| WO | WO 2005/060416 A3 | 7/2005 |
| WO | WO 2007/019689 A1 | 2/2007 |

OTHER PUBLICATIONS

International Search Report for International application No. PCT/US2007/011654, mailed Dec. 18, 2007.
International Search Report from corresponding International Application No. PCT/US2006/048924, filed Dec. 20, 2006.
Cisco Systems, The Benefits of Centralization in Wireless LANs via the Cisco Unified Wireless Network, White Paper, Feb. 2006, 13 pages., http://www.cisco.com/application/pdf/en/us/guest/products/ps6521/c1650/cdccont_0900aecd8040f7b2.pdf.
Klein et al., "Service Rings—A Semantic Overlay for Service Discovery in Ad hoc Networks," Institute for Program Structures and Data Organisation, Universität Kalsruhe, Karlsruhn, Germany, 7 pages, http://citeseer.ist.psu.edu/cache/papers/cs/27184/http:zSzzSzwww.ipd.uka.dezSzDIANEzSzenzSzinhaltezSz..zSz..zSzdocszSzNBIS2003.pdf/klein03service.pdf.
Lenders et al., "Service Discovery in Mobile Ad Hoc Networks: A Field Theoretic Approach," Swiss Federal Institute of Technology (ETH Zürich), Switzerland, 11 pages http://www.tik.ee.ethz.ch/~lenders/publication/lenders_wowmom05.pdf Partly founded by the Swiss National Science Foundation (SNF) under grant 200021-103578.
Meier, et al., "Proximity-Based Service Discovery in Mobile Ad Hoc Networks," Distributed Systems Group, Department of Computer Science, Trinity College, Dublin, Ireland, 15 pages, http://www.es.tcd.ie/publications/tech-reports/reports.05/TCD-CS-2005-35.pdf.
Poupyrev, et al., "Service Discovery in TinyObj: Strategies and Approaches," The Graduate School of Frontier Science, Tokyo University, Peter Davis, Adaptive Communications Research Laboratories, ATR, 4 pages, http://www.medien.ifi.lmu.de/permid2005/pdf/PavelPoupyrev_Permid2005.pdf.
Raverdy et al., "A Multi-Protocol Approach to Service Discovery and Access in Pervasive Environments," 7 pages, http://www-c.inria.fr/plastic/test-1/raverdy_mobiquitous.pdf.
Samulowitz et al., "Adaptive Interaction for Enabling Pervasive Services," 2001, pp. 20-26, http://delivery.acm.org/10.1145/380000/376886/p20-samulowitz.pdf?key1=376886&key2=4070384811&coll=GUIDE&dl=GUIDE&CFID=28883839&CFTOKEN=55961476.
STMicroelectronics, "Dual-band IEEE 802.11a/b/g mobile Wi-Fi solution," Product Description, Feb. 2006, 2 pages, http://www.st.com/stonline/products/promlit/pdf/fldual0206.pdf.
Wojtiuk, "Bluetooth and WiFi integration: Solving co-existence challenges," Semiconductor Technology, Oct. 2004, pp. 20-26, http://rfdesign.com/mag/410rfdf1.pdf.
S. Helal, N. Desai, V. Verma and C. Lee, "Konark—A Service Discovery and Delivery Protocol for Ad-Hoc Networks," http://media,csee.ltu.se/reading/papers/konark_wcnc2003.pdf, 2003, pp. 1-7.
A. Friday, N. Davies, N. Wallbank, E. Catterall and S. Pink, "Supporting Service Discovery, Querying and Interaction in Ubiquitous Computing Environments," *Wireless Networks*, 2004, pp. 631-641, vol. 10, Kluwer Academic Publishers, The Netherlands.

J. Krumm and K. Hinckley, "The NearMe Wireless Proximity Server," UbiComp 2004, The Sixth International Conference on Ubiquitous Computing, pp. 283-300. Sep. 7-10, 2004, Nottingham, England.
J. Rekimoto, Y. Ayatsuka, M. Kohno and H. Oba, "Proximal Interactions: A Direct Manipulation Technique for Wireless Networking," Human-Computer-INTERACT'03, M Rauterberg et al. (eds.), Published by IOS Press, (c) IFIP, 2003, pp. 511-518, http://www.idemployee,id.tue.nl/g.w.m.rauterberg/conferences/INTERACT2003/INTERACT2003-p511.pdf.
S. Helak, N. Desai, V. Verma, and C. Lee, "Konark—A Service Discovery and Delivery Protocol for Ad-Hoc Networks," 2003, pp. 1-7, University of Florida, Gainesville, Florida. http://media.csee.ltu.se/reading/papers/konark_wcnc2003.pdf.
A. Friday, N. Davies, N. Wallbank, E. Catterall, and S. Pink, "Supporting Service Discovery, Querying and Interaction in Ubiquitous Computing Environments," Wireless Networks, 2004, pp. 631-641, vol. 10, Kluwer Academic Publishers, The Netherlands. http://delivery.acm.org/10.1145/1040000/1035680/p631-friday.pdf?key1=1035680&key2=6630472311&coll=GUIDE&dl=GUIDE&CFID=58960884&CFTOKEN=5973545.
J. Krumm and K. Hinckley, "The NearMe Wireless Proximity Server," UbiComp 2004, The Sixth International Conference on Ubiquitous Computing, pp. 283-300, Sep. 7-10, 2004, Nottingham, England. http://research.microsoft.com/users/kenh/papers/NearMe.pdf.
J. Rekimoto, Y. Ayatsuka, M. Kohno, and H. Oba, "Proximal Interactions: A Direct Manipulation Technique for Wireless Networking," 2003, pp. 1-8, Sony Computer Science Laboratories, Inc., Toyko, Japan. http://www.idemployee.id.tue.nl/g.w.m.rauterberg/conferences/INTERACT2003/INTERACT2003-p511.pdf.
International Search Report, dated Jun. 18, 2007, regarding Int'l App. No. PCT/US2006/048934.
International Preliminary Report on Patentability, dated Jul. 3, 2008, regarding Int'l App. No. PCT/US2006/048924.
International Preliminary Report on Patentability, dated Nov. 27, 2008, regarding Int'l App. No. PCT/US2007/011636.
International Preliminary Report on Patentability, dated Nov. 27, 2008, regarding Int'l App. No. PCT/US2007/011654.
U.S. PTO Action, dated Mar. 28, 2008, regarding U.S. Appl. No. 11/312,040.
U.S. PTO Action, dated Oct. 24, 2008, regarding U.S. Appl. No. 11/312,040.
U.S. PTO Action, dated Dec. 10, 2008, regarding U.S. Appl. No. 11/434,393.
Office Action, U.S. PTO, dated Apr. 28, 2009, regarding U.S. Appl. No. 11/434,393.
Notice of Allowance, dated May 7, 2009, regarding U.S. Appl. No. 11/312,040.
Office Action, U.S. PTO, dated Jun. 25, 2009, regarding U.S. Appl. No. 11/434,394.
Amendment & Response to Final Office Action mailed Dec. 17, 2009, filed in U.S. Appl. No. 11/434,394 on Mar. 17, 2010.
Amendment & Response to Non-Final Office Action mailed Jun. 25, 2009, filed in U.S. Appl. No. 11/434,394 on Sep. 25, 2009.
Amendment after Notice of Allowance mailed May 7, 2009, filed in U.S. Appl. No. 11/312,040 on Jul. 27, 2009.
Amendment & Response to Final Office Action mailed Oct. 24, 2008, filed in U.S. Appl. No. 11/312,040 on Jan. 26, 2009.
Amendment & Response to Non-Final Office Action mailed Mar. 28, 2008, filed in U.S. Appl. No. 11/312,040 on Jul. 28, 2008.
Amendment & Response to Non-Final Office Action mailed Apr. 13, 2010, filed in U.S. Appl. No. 11/434,393 on Jun. 25, 2010.
Amendment & Response to Non-Final Office Action mailed Oct. 5, 2009, filed in U.S. Appl. No. 11/434,393 on Jan. 5, 2010.
Amendment & Response to Final Office Action mailed Apr. 28, 2009, filed in U.S. Appl. No. 11/434,393 on Jun. 29, 2009.
Advisory Action mailed on Jul. 6, 2009 in response to Amendment & Response to Final Office Action mailed Apr. 28, 2009, filed in U.S. Appl. No. 11/434,393 on Jun. 29, 2009.
Amendment & Response to Non-Final Office Action mailed Dec. 10, 2008, filed in U.S. Appl. No. 11/434,393 on Mar. 10, 2009.

Final Office Action mailed on Dec. 17, 2009 in U.S. Appl. No. 11/434,394.
Supplemental Notice of Allowability mailed Jul. 31, 2009 in U.S. Appl. No. 11/312,040.
Non-Final Office Action mailed Apr. 13, 2010 in U.S. Appl. No. 11/434,393.
Non-Final Office Action mailed Oct. 5, 2009 in U.S. Appl. No. 11/434,393.
Final Office Action mailed Sep. 2, 2010 in U.S. Appl. No. 11/434,393.
Advisory Action mailed Jul. 22, 2009 in U.S. Appl. No. 11/434,393.
European Communication mailed Dec. 23, 2008 in Application No. 07809088.3.
European Communication mailed Aug. 5, 2008 in Application No. 06847984.9.
European Communication mailed Jul. 31, 2008 in Application No. 06847989.8.
European Communication mailed Dec. 29, 2008 in Application No. 07809085.9.
PCT Written Opinion of the International Searching Authority mailed Jun. 19, 2007 in International Application No. PCT/US2006/048924.
PCT Written Opinion of the International Searching Authority mailed Jun. 18, 2007 in International Application No. PCT/US2006/048934.
PCT International Preliminary Report and Written Opinion on Patentability mailed Jun. 24, 2008 in International Application No. PCT/US2006/048934.
PCT Written Opinion of the International Searching Authority mailed Dec. 20, 2007 in International Application No. PCT/US2007/011636.
PCT Written Opinion of the International Searching Authority mailed Dec. 18, 2007 in International Application No. PCT/US2007/011654.
PCT International Preliminary Report and Written Opinion on Patentability mailed Nov. 17, 2008 in International Application No. PCT/US2007/011654.
PCT International Preliminary Report and Written Opinion on Patentability mailed Jun. 24, 2008 in International Application No. PCT/US2006/048924.
PCT International Preliminary Report and Written Opinion on Patentability mailed Nov. 17, 2008 in International Application No. PCT/US2007/011636.
China Intellectual Property Office of The People's Republic of China Notice on the First Office Action mailed Jul. 30, 2010, in Application No. 200680047829.0.
China Intellectual Property Office of The People's Republic of China Notice on the First Office Action mailed Aug. 4, 2010, in Application No. 200680047831.8.
German Response to Communication dated Dec. 23, 2008, filed Jan. 16, 2009, EU Appl. No. 07 809 088.3.
German Response to Communication dated Aug. 6, 2008, filed Sep. 2, 2008, EU Appl. No. 06 847 984.9.
German Response to Communication dated Jul. 31, 2008, filed Aug. 25, 2008, EU Appl. No. 06 847 989.8.
German Response to Communication dated Dec. 29, 2008, filed Jan. 26, 2009, EU Appl. No. 07 809 085.9.
Japanese Notice of Rejection mailed Sep. 14, 2009 in Application No. 2008-547583.
Response to Japanese Notice of Rejection mailed Sep. 14, 2009 in Application No. 2008-547583, filed May 11, 2010.
Japanese Nominal Appeal and Voluntary Amendment filed Aug. 23, 2010 in Japanese Patent Application No. 2008-547583.
International Search Report mailed Dec. 18, 2007 in International Publication No. WO 2007/133785.
International Search Report mailed Jun. 19, 2007 in International Publication No. WO 2007/075961.
International Search Report mailed Jun. 18, 2007 in International Publication No. WO 2007/075968.
International Search Report mailed Dec. 20, 2007 in International Publication No. WO 2007/136622.
European Search Report issued in Application No. 06847989.8 dated Jan. 23, 2012, 7 pages.
European Search Report issued in Application No. 06847989.9 dated Jan. 19, 2012, 7 pages.
Guttman E., "Service Location Protocol: Automatic Discovery of IP Network Services," IEEE Internet Computing, IEEE Service Center, NY, NY, vol. 3, No. 4, Jul. 1, 1999, XP002140936, pp. 71-80.
802.11 Beacons Revealed, [retrieved on Mar. 19, 2007], Retrieved from http://wi-figurus.com/index2.php?option=com_content&do_pdf=1&id=47, 2 p.
Amendment & Response to Final Office Action mailed Sep. 2, 2010, filed in U.S. Appl. No. 11/434,393 on Nov. 15, 2010, 11 pp.
Amendment & Response to Non-Final Office Action mailed Jan. 21, 2011, filed in U.S. Appl. No. 11/434,393 on Apr. 15, 2011, 8 p.
Chandra et al., "Beacon-Stuffing: Wi-Fi Without Associations," IEEE Communications Society, Feb. 2007, 6 pp.
China Intellectual Property Office of The People's Republic of China Notice on the Second Office Action mailed Dec. 21, 2011, in Application No. 200680047831.8, 6 pp.
China Intellectual Property Office of The People's Republic of China Notice on the Second Office Action mailed Dec. 23, 2011, in Application No. 200680047829.0, 14 pp.
China Intellectual Property Office of The People's Republic of China Response to Notice on the First Office Action mailed Aug. 4, 2010, in Application No. 200680047831.8, filed Nov. 29, 2010, 18 pp.
China Intellectual Property Office of The People's Republic Response to China Notice on the First Office Action mailed Jul. 30, 2010, in Application No. 200680047829.0, filed Nov. 26, 2010, 20 pp.
China Notice on the First Office Action mailed Jan. 6, 2012, in Application No. 200780017769.2, 3 pp.
China Notice on the First Office Action mailed Nov. 12, 2010, in Application No. 200780013376.4, 9 pp.
China Response to Notice on the First Office Action mailed Jan. 6, 2012, in Application No. 200780017769.2, filed Feb. 7, 2012, 9 pp.
Davies et al, "Using and Determining Location in a Context-Sensitive Tour Guide," Computer, vol. 34, Issue 8, Aug. 2001, pp. 35-41, 7 pp.
DiSorte et al., "Beacon-Based Service Publishing Framework in Multiservice Wi-Fi Hotspots," EURASIP Journal on Wireless Communications and Networking, vol. 2007, Article ID 38463, Hindawai Publishing Corporation, 18 pages, 2004, 19 pp.
Edwards, K. "Core Jini" Jun. 1999, PTR Prentice Hall, 1st Edition XP002212106, p. 68—Line 18, p. 79—line 13.
European Amendment filed Aug. 25, 2008 in Application No. 6847989.8, 7 p.
European Amendment filed Jan. 16, 2009 in Application No. 07809088.3, 7 p.
European Amendment filed Jan. 26, 2009 in Application No. 07809085.9, 14 pp.
European Amendment filed Sep. 2, 2008 in Application No. 6847984.9, 8 p.
European International Search Report filed Jan. 14, 2008 in Application No. 07809085.9, 3 p.
European International Search Report filed Jun. 18, 2007 in Application No. 6847984.9, 4 p.
European International Search Report filed Mar. 20, 2008 in Application No. 07809088.3, 3 pp.
European Search Report filed Aug. 16, 2007 in European Patent Application No. 06847989.8, 4 p.
Final Office Action mailed Jun. 30, 2011 in U.S. Appl. No. 11/434,393, 22 pp.
Hamalainen, "Business Models Based on Facilities Bundling: Success Criteria," Helsinki University of Technology, Networking Laboratory, 2006.; pp. 1-6.
Hodes et al., "Composable ad hoc location-based services for heterogeneous mobile clients," Wireless Networks, No. 5, 1999, 17 pp.
International Search Report and Written Opinion from International Application No. PCT/US2009/031451 mailed Jun. 29, 2009, 48 pp.
International Search Report and Written Opinion from International Application No. PCTIUS2007/007745 mailed Sep. 12, 2007, 43 pp.
International Search Report from corresponding International Application No. PCT/US2006/048934, Dec. 20, 2006, 4 p.
International Search Report from International Application No. PCT/US2001/15099 mailed Sep. 25, 2002, 5 p.

International Search Report from International Application No. PCT/US2008/077442 mailed Mar. 31, 2009, 4 p.

International Search Report from International Application No. PCTIUS2008/077388 mailed Feb. 17, 2009, 37 pp.

Jamaluddin et al., Hotring Advertising Model for Broadband Hotspots, IEEE Communications Society, WCNC 2004, pp. 2064-2068, 2004, 5 p.

Japanese Notice of Rejection mailed Jan. 14, 2011 in Application No. 2008-547583, 3 p.

Japanese Notice of Rejection mailed Sep. 30, 2011, in Application No. 2009-511029, 6 p.

Jones et al., "What Where Wi: An Analysis of Millions of WI-Fi Access Points," Division of Computer Science and Systems, Georgia Institute of Technology, Atlanta, GA, 2007, 8 p.

Koskela et al., "Combining WLAN Indoor Positioning and Multimedia Messaging Services," Tampere University of Technology, Pori, Finland, 2003, 6 p.

Melnikov, "Open Solutions for Location Based Services in WLAN Environment," Tampere University of Technology, Pori, Finland, Mar. 2004, 66 pp.

Munson et al., "Flexible Internetworking of Devices and Controls," Industrial Electronics Society, 1999, the 25th Annual Conference of the IEEE San Jose, CA, USA, Nov. 29 to Dec. 3, 1999, pp. 1139-1145.

New Networking Features in Windows Server 2008 and Windows Vista, [retrieved on Apr. 25, 2007], Retrieved from http://technet.microsoft.com/en-gb/library/bb726965(d=printer).aspx, 53 pp.

Non-Final Office Action mailed Jan. 21, 2011 in U.S. Appl. No. 11/434,393, 22 pp.

Pagurek et al., "Management of Advanced Services in H.323 Internet Protocol Telephony," Proceedings IEEE INFOCQM, The Conference on Computer Communications, Tel Aviv, Israel, Mar. 26, 2000, 10 pp.

Polk, et at, "Dynamic Host Configuration Protocol Option for Coordinate-based Location Configuration Information," Network Working Group, Standards Track, Jul. 2004, 11 pp.

Quigley et al., "BlueStar, a Privacy Centric Location Aware System," IEEE Position, Location and Navigation Symposium 2004, Monterey, USA Apr. 26-29, 2004, 10 pp.

Russian Decision to Grant mailed Sep. 4, 2011 in Russian Application No. 2008145037, 16 pp.

Trevor et at, "The Use of Adapters to Support Cooperative Sharing," Proceedings of the Conference on Computer Supported Cooperative Work, Oct. 22, 1994, pp. 219-230.

Wong, W.H., et al., "Wireless LAN Positioning with Mobile Devices in a Library Environment," Distributed Computing Systems Workshops, 2005, 25th IEEE International Conference, Jun. 6, 2005, pp. 633-636.

U.S. Appl. No. 11/434,394, Office Action mailed May 22, 2012, 16 pgs.

Supplementary European Search Report for EP Application No. 08837680.1, mailed Jun. 13, 2012, 7 pgs.

Chinese First Office Action in Application 200880111352.7, mailed Jun. 5, 2012, 8 pgs.

CN Notice on the First Office Action for Application No. 200980106136.8, Aug. 27, 2012 (15 pages).

Japanese Notice of Allowance mailed Nov. 2, 2012, Application No. 2008-547578 (4 pages).

US Amendment filed Aug. 22, 2012, in U.S. Appl. No. 11/434,394 (13 pages).

US Non-Final Office Action mailed Sep. 21, 2012, in U.S. Appl. No. 12/035,531 (17 pages).

US Non-Final Office Action mailed Nov. 16, 2012, in U.S. Appl. No. 13/250,655 (7 pages).

US Notice of Allowance filed Nov. 8, 2012, in U.S. Appl. No. 11/434,394 (12 pages).

China Intellectual Property Office of The People's Republic of China Final Rejection mailed Apr. 1, 2012, in Application No. 20060047829.0, 21 pgs.

China Intellectual Property Office of The People's Republic of China Notice of Allowance mailed Apr. 9, 2012, in Application No. 200680047831.8, 4 pgs.

Japanese Notice of Allowance mailed Apr. 13, 2012, in Application No. 2009-511029, 4 pgs.

European Search Report filed Mar. 15, 2013, in Application No. 07809085.9 (8 pages).

US Notice of Allowance filed Mar. 11, 2013, in U.S. Appl. No. 11/434,394 (8 pages).

Chinese Application 200980106136.8, Notice on the Second Office Action mailed May 6, 2013 (11 pages).

* cited by examiner

PROXIMITY SERVICE DISCOVERY IN WIRELESS NETWORKS

BACKGROUND OF INVENTION

1. Field of Invention

The invention relates to discovering, using wireless communication, a service provided by a device prior to establishing a connection with the device.

2. Discussion of Related Art

Wireless communication technologies such as 802.11x and Bluetooth enable devices to communicate wirelessly over a relatively short range, e.g., less than 100 meters. To discover other wireless devices, a device broadcasts wireless messages and listens for wireless messages from other devices. If another device is discovered, a wireless connection may be established between the devices. Once a connection is established, devices may exchange various types of information. For example, devices may exchange information related to providing a service (e.g., printing, headset connectivity, PDA synchronization, etc.) provided by one of the devices.

A variety of services may be provided by communicating wirelessly between devices. As one example, a laptop computer may communicate wirelessly with a printer to print documents. Once a wireless connection is established between the computer and the printer, the computer may discover the print services provided by the printer. The computer may then take advantage of printing services offered by the printer via the wireless connection.

Previously developed IP-based methods of discovering services require a connection to be established with a device before services provided by a device can be discovered. For example, network discovery protocols such as SSDP (Simple Service Discovery Protocol), WS-Discovery (Web Services Discovery), and SLP (Service Location Protocol) require network layer connectivity (Layer 3 of the OSI model) to be established prior to the discovery of services on the network. Once connected, services provided by a device send broadcast or multicast messages over the IP network to advertise their services. Previously developed IP-based methods of service discovery did not provide a way of determining whether the device that provides the service was in the proximity of the device that required the service.

SUMMARY OF INVENTION

In prior systems, services provided by a device could be discovered after establishing a connection with the device. The inventors have appreciated that it may be desirable to discover a service provided by a device prior to establishing a connection with the device. Enabling discovery of services prior to establishing a connection may facilitate finding a desired service in an 802.11x, Ultrawideband (UWB) or other suitable network environment. Such discovery may be particularly useful in a wireless context in which a wireless signals may only be transmitted effectively over a relatively short distance, since service discovery may therefore be limited to only those devices within close proximity of the user. For example, a computer user entering an unfamiliar building may wish to determine whether she can print a document using a nearby printer. The user may not wish, however, to establish a connection with a local wireless network or individual device to only to find out whether a suitable printer is located nearby. In accordance with one aspect of the invention, the user may send a wireless request from her computer effectively asking local devices in a network whether a suitable print service is offered. In response, a printer or other device acting on behalf of the printer may send a response to the computer indicating the type of print service(s) that are available. Thereafter, the user may establish a connection with the network and/or a particular device (such as a printer) to obtain the desired services. In another aspect of the invention, the user may passively listen to service messages advertised by local devices. The user may request and receive additional information from a particular device and/or establish a connection with the device to obtain the desired services.

In one embodiment, the invention relates to a method of accessing, by a first device, a service provided by a second device that is in a proximity of first device. The method includes a step of sending a wireless request message requesting a response regarding a requested service. The method also includes receiving a wireless response message regarding the requested service, and determining, based on the wireless response message, whether the requested service is provided by the second device prior to establishing a connection between the first device and the second device that is suitable for providing the requested service. A connection may be established between the first and second device, if the second device provides the requested service.

In another embodiment, the invention relates to a computer-readable medium having computer-executable instructions for performing steps. The steps include sending, by a first device, a wireless request message requesting a response regarding a requested service. A wireless response message may be received, from a second device, regarding the requested service, and a determination may be made, based on the wireless response message, whether the requested service is provided by a second device in a proximity of the first device, prior to establishing a connection between the first device and the second device that is suitable for providing the requested service. A connection may be established between the first device and the second device, if the second device provides the requested service.

In yet another embodiment, the invention relates to a computer-readable medium having computer-executable instructions for performing steps including receiving, at a second device and from a first device, a wireless request message requesting a response regarding a requested service. A determination may be made whether the second device provides the requested service, and a wireless response message may be sent to a first device regarding the requested service, if the requested service is provided by the second device, prior to establishing a connection between the first device and the second device that is suitable for providing the requested service. A connection may be established between the first device and the second device, in response to a connection request from the first device.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

As discussed above, prior wireless network arrangements typically required a user to establish a connection with a device and/or with the network to determine whether a desired service is offered. For example, a guest may bring a laptop computer to a meeting in an unfamiliar office building. If he wishes to print a document, he may first have to establish a connection between his laptop and a local network within the office building. After a connection is established, the laptop computer may determine if a printer is connected to the network. There may be many printers available on the network, some of which are nearby and some of which may be far away, such as on a different floor of the building. In some cases, it may be difficult to determine which printers are nearby. Furthermore, it may be undesirable to provide guests with access to the local network for security reasons. For example, connecting to the local network may allow the guest access to confidential information stored on the network.

As another example, several wireless devices, e.g., printers capable of communicating wirelessly, may be present in the proximity of the wireless-enabled device. In previous systems, a device that desires a particular service from another device would first have to connect to a device and then determine the services that it provides. It may be time consuming to connect to several devices until a device is found that provides the desired service.

In accordance with aspects of the invention, discovery of services prior to establishing a connection with a device may enable a user of a wireless-enabled device (e.g., a laptop computer, PDA or telephone) to find a device that provides a desired service in the proximity of the wireless-enabled device. For example, in one aspect of the invention, a service provided by a local device may be discovered by sending and receiving radio messages prior to establishing a connection with the device. The services that are discovered may be nearby because they are within the radio range of the wireless-enabled device seeking the service(s). For example, if a person brings a laptop to a meeting in an unfamiliar office building, the laptop may exchange wireless messages with devices nearby. His laptop screen may display a list of devices that provide services nearby, e.g., nearby wireless printers, and the types of services they provide. He may then select an appropriate device with which a wireless connection will be established. As a result, obtaining the desired service may be facilitated.

In a first embodiment, a wireless-enabled device may send radio messages to discover services provided by other devices and may actively seek out a particular service. In another embodiment, the device may passively discover services by listening to advertised service messages provided by other local devices. In yet another embodiment, a device may use active and passive techniques to discover services.

Figure 1:
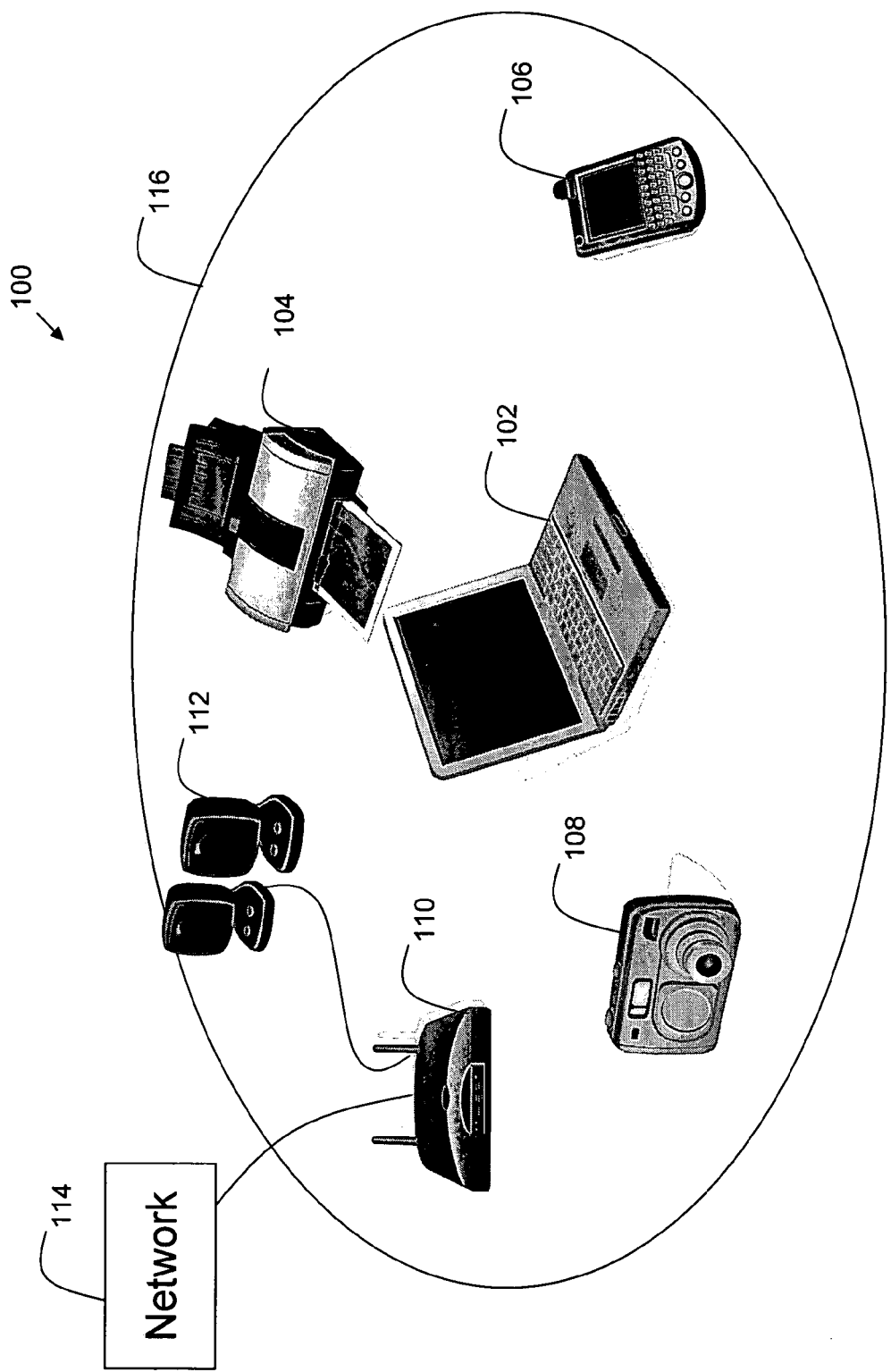
FIG. 1 is diagram illustrating an example of a network environment in which services may be discovered according to some embodiments of the invention.

FIG. 1 is a diagram illustrating an example of a network environment 100 in which devices may communicate regarding service discovery according to some embodiments of the invention. FIG. 1 illustrates an example of a wireless-enabled device 102, e.g., a laptop computer, and examples of other devices with which the device 102 may communicate wirelessly, including: printer 104, personal digital assistant (PDA) 106, camera 108 and access point 110. FIG. 1 also illustrates an example of a speaker system 112 and wired network 114 that are communicatively coupled to access point 110. Devices in the network environment 100 may communicate wirelessly using any suitable wireless standard such as 802.11x or Ultrawideband (UWB).

Wireless-enabled device 102 may be a laptop computer or any other device configured to send and receive wireless communications, such as a PDA, a cell phone, or any other suitable device. Wireless-enabled device 102 may be configured to interface with a human user, i.e., using a screen, keyboard, touchpad or any other suitable interface.

A user of wireless-enabled device 102 may desire a particular service. For example, the user may wish to establish a wireless connection between wireless-enabled device 102 and a printer for printing documents. The user may command wireless-enabled device 102 to search for a particular service, e.g., a print service.

Figure 2:
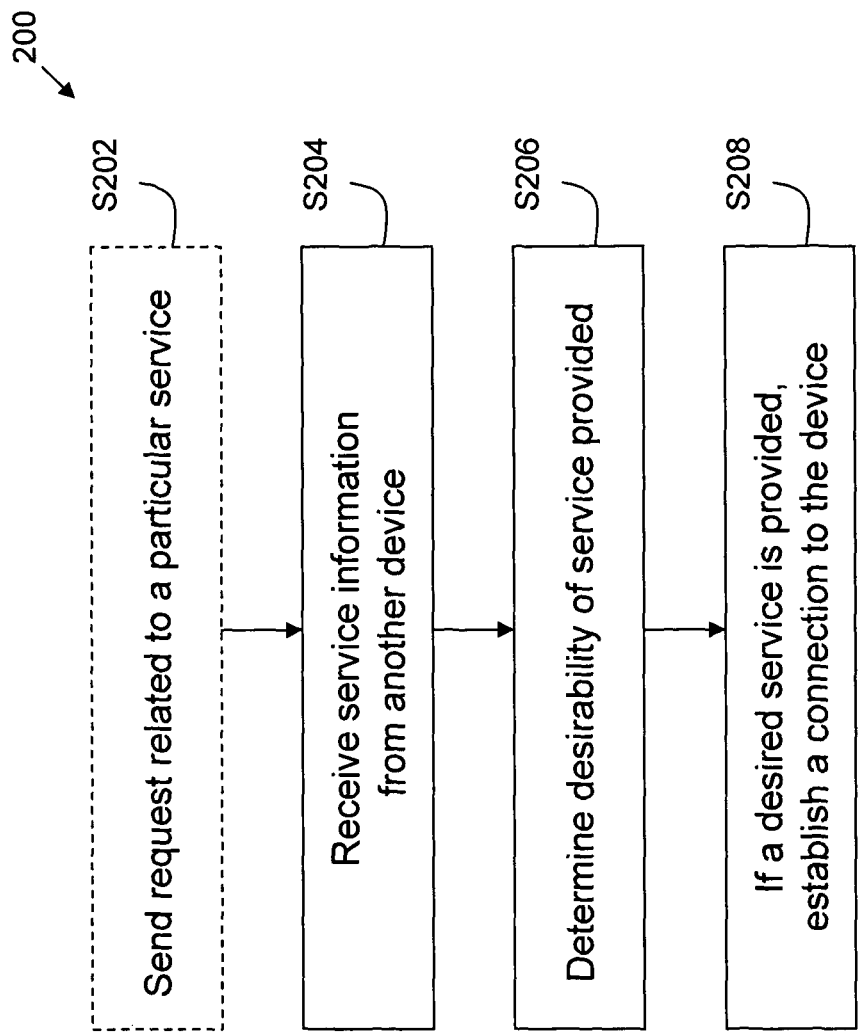
FIG. 2 is a flowchart illustrating an example of a method of accessing a particular type of service.

FIG. 2 illustrates an example of a method 200 of accessing a service that may be used by the device 102 in the environment shown in FIG. 1. In step S202, wireless-enabled device 102 may send a request message that requests a particular service. Wireless-enabled device 102 may broadcast the request message, e.g. a radio message, requesting a particular service, e.g., a printing service. In one aspect of the invention, the request message may be included in an 802.11x probe message. The request message may be encoded with information that represents the type of service sought by wireless-enabled device 102. For example, the radio message may be encoded with information, which, when received and decoded, indicates that a printing service has been requested. The request message may be broadcast repeatedly until wireless-enabled device 102 receives a response message. For example, the request message may be broadcast periodically.

As illustrated in FIG. 1, devices that receive the request message may be present in the proximity 116 of wireless-enabled device 102. The proximity 116 of wireless-enabled device 102 may be defined by the radio range of wireless-enabled device 102 and/or a range of devices receiving the request message. As one example, the proximity 116 of wireless-enabled device 102 may include the space within approximately 100 meters of wireless-enabled device 102. The radio range may be greater than or less than 100 meters depending on various factors including the technology used, the strength of the transmitter, the amount of noise present on the channel, the physical environment in which wireless-enabled device 102 operates, etc. However, the proximity 116 of wireless enabled device 102 need not necessarily be defined by the radio range, but may be determined based on other factors, as will be discussed in further detail below. A device in the proximity 116 of wireless-enabled device 102 may receive the request message.

In step S204, the device 102 may receive service information from another device in the network. This service information may include information regarding details of the service provided, such as whether a print service offered by the printer 104 includes a color printing option or not. In step S206, the device 102 may determine whether the offered service is desired, and may establish a connection to the device in step S208 if a determination is made that the service is desired.

Figure 3:
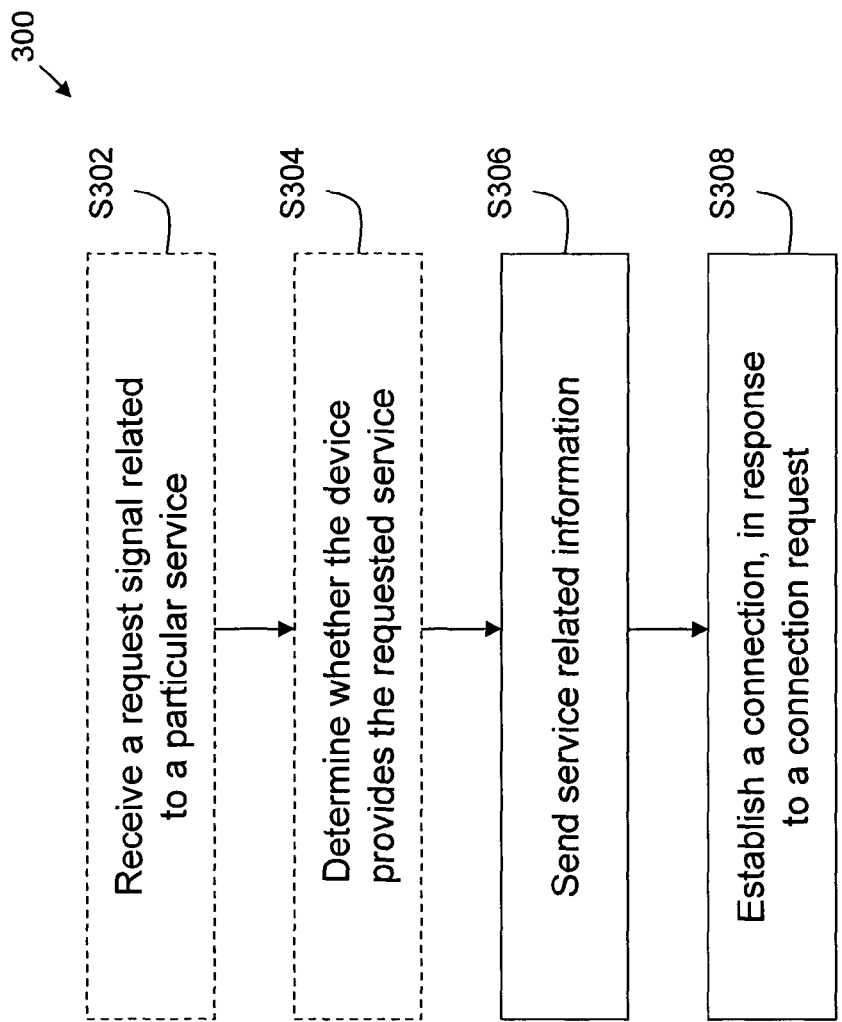
FIG. 3 is a flowchart illustrating an example of a method of providing information related to a service.

FIG. 3 illustrates an example of a method 300 of providing information related to a service that may be performed by a device, e.g., printer 104, that provides a particular service and that responds to a request message sent from the device 102.

In step S302, the request for a particular service may be received, e.g., from the device 102. The request message may be received by printer 104, PDA 106, camera 108 and access point 110 because they are in the radio range of wireless-enabled device 102. Once the request message is received by printer 104, the request message may be decoded to determine the service requested.

In step S304, a device that received the request message may determine whether it provides the requested service. Once printer 104 determines the service that has been requested, printer 104 may compare the type of service requested with the type of services that printer 104 provides. This comparison may be made in any suitable way. For example, fields in received request may be compared to fields of a data structure that represents a type of service provided by the device. In this example, printer 104 provides the printing services requested by wireless-enabled device 102.

In response to determining that it provides the requested service, printer 104 may respond by sending a response message, e.g., a radio message, to wireless-enabled device 102 in step S306. PDA 106, camera 108 and access point 110 may also receive the request message, but may not respond to the request message because they do not provide the type of service requested. Alternately, the request received in step S302 may be a general request for local devices to provide an indication of services provided, regardless of service type. In this case, PDA 106, camera 108, access point 110, etc. may respond accordingly.

The response message may include information about the service(s) provided by the device. For example, the response message sent by printer 104 may include information about the printing services provided by printer 104. The response message may be encoded with information about whether printer 104 is a color printer, whether it can print on both sides of a page and/or or other information. Information about services may be sent as an information element (IE) discussed below. Thereafter, if the device 102 wishes to establish a connection, the connection may be established in step S308 so that the device 102 may obtain the desired service.

Figure 4:
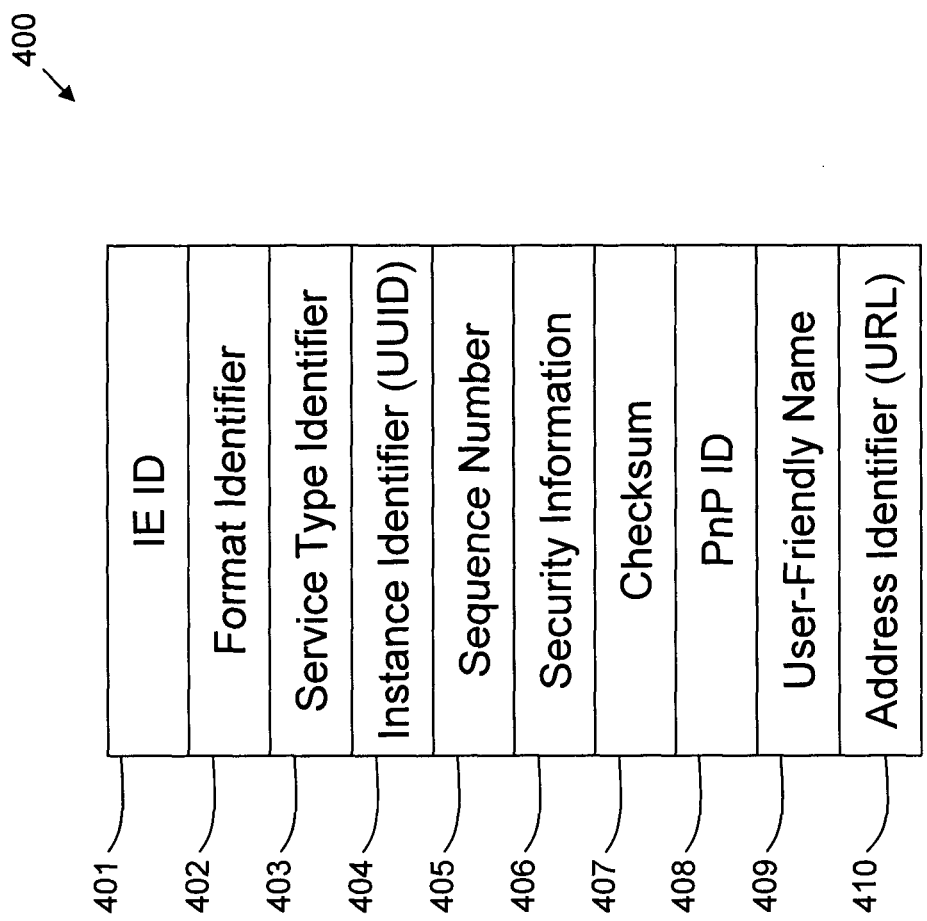
FIG. 4 is a diagram illustrating an example of an information element that may include information about a service.

FIG. 4 is a diagram illustrating an example of an IE 400. An IE may be a format for sending service-related information recognized by devices that communicate according to a particular wireless standard. For example, the format of the IE may match the capabilities of the underlying standard, e.g. 802.11 or UWB. An IE may be transmitted in TLV (type, length, value) format. In the example illustrated in FIG. 4, IE 400 includes an IE ID 401, a format identifier 402, a service type identifier 403, an instance identifier (UUID) 404, a sequence number 405, security information 406, a checksum 407, a PnP ID 408, a user-friendly name 409, and an address identifier 410.

IE ID 401 may be a protocol header that identifies the information as an IE.

Format identifier 402 may include information representative of the coding format of the IE. For example, format identifier 402 may represent the type of service discovery protocol that is used to interface with higher levels in the protocol stack. Any suitable service discovery protocols may be used, such as SSDP, WS-Discovery, SLP and Rendezvous.

Service type identifier 403 may include information that represents a type of service, e.g., a print service, that is provided by the device.

UUID 404 may be a unique identifier that identifies the device. For example, a UUID may be a permanent address associated with the device.

Sequence number 405 may be a number used to represent a change in the service. If the sequence number 405 is different from the number expected by the wireless-enabled device 102, wireless-enabled device 102 may send a message to determine more recent information about the service. For example, a printer may indicate that the status of the printer has changed by incrementing the sequence number 405. When queried, the printer may respond to indicate, for example, that it is out of paper.

Security information 406 may include information that represents the type of security required by the device. For example, a particular type of encryption and/or authentication may be required to establish a connection with the device.

A checksum 407 may be included to allow for error checking.

The PnP ID 408 may include information about a specific driver that is required to use the service. If no specific driver is indicated, a generic driver may be used.

A user-friendly name 409 may be an identifier that identify the device to a user, e.g., Building 3 Printer.

Address identifier 410 may include a URL for a location that can be accessed to obtain further information about services provided by the device. For example, the URL may point to a description page that provides information about the details of functions performed by a printer, e.g., color printing or two-sided printing.

To reduce the size of the IE, portions of the IE may be hashed using any suitable hashing function. For example, the service type identifier 403 may be hashed to determine a hash sum. Upon receipt of the IE by wireless-enabled device 102, the hash sum may be compared with a hash table to match the hash sum with its corresponding service type. Transmitting a hashed representation of information may reduce the amount of data to be transmitted.

As discussed above with respect to FIGS. 2 and 3, a device may send a message that includes an IE to the device 102 in step S206 and S306. Based on the IE, the wireless-enabled device 102 may determine whether the device provides the requested service, for example, by comparing the received information about the service provided with the type of service that was requested. This determination may be made in any suitable way. For example, fields of the received IE may be compared with fields of a "desired" IE. Any suitable matching criteria may be used to determine whether the discovered service is appropriate.

Once it is determined that the requested service is provided by the device, wireless-enabled device 102 may take further action. For example, wireless-enabled device 102 may indicate to a user that the requested service, e.g., a print service, is available. This indication may be made in any suitable way, e.g., by displaying a visual image that represents to the user the availability of the print service. If desired, the user may then initiate a connection between wireless-enabled device 102 and printer 104. However, the connection need not necessarily be initiated by the user. Wireless-enabled device 102 may be programmed to establish a connection based on one or more criteria. For example, wireless-enabled device 102 may be programmed to automatically connect to devices in the proximity which provide a "preferred" type of service. As another example, a wireless-enabled device may be programmed to connect to the closest device that provides a particular service, e.g., the closest printer. For example, a user may command the device 102 to print a document, whereupon the device 102 may initiate the method 200, resulting in the establishment of a connection with the printer 104 and printing of the document. To facilitate connecting to the closest device, the distance between devices may be determined using mechanisms provided by the wireless technology used, e.g., 802.11 or UWB. As another example, information in the IE may be compared with a block/deny list to determine whether wireless-enabled device 102 should communicate further with the device.

In some circumstances, a device such as printer 104 may require authentication for a connection to be established. If authentication is required, the user of wireless-enabled device may be prompted to enter a password, pin or other identification number such as an identification number derived from biometric information, e.g., a fingerprint, or retinal scan. Authentication may be provided using any suitable security protocol, such as IPsec. Authentication may alternately be based on payment or billing information, e.g., so that services are only provided once a payment agreement has been reached. If the authentication is successful, a connection may then be established.

Once a connection has been established between a wireless-enabled device and a device that provides a service, the devices may communicate further with respect to providing the requested service. For example, wireless-enabled device 102 may communicate wirelessly with printer 104 to print documents. The service that is provided may be provided in any suitable known manner or in any suitable manner developed hereafter.

When aspects of the invention are used in an 802.11x context, a connection may be established at Layer 2 of the OSI model. However, the invention is not limited to 802.11x networks, but may be used in UWB networks or a network that uses any other suitable protocol. As applied to 802.11x, UWB or any other suitable network, the term "establishing a connection" means that a first device sends a connection request to a second device and the second device responds to accept the connection.

The description above with respect to FIGS. 2 and 3 relates to an embodiment in which a device 102 actively seeks out whether desired services are available in a given area. In another embodiment of the invention, a device 102 may passively determine those services that may be available. For example, one or more devices that provide a service may send an advertisement message to advertise the service that it provides to the device 102 and/or other devices. The advertisement message may be a radio message that advertises a particular service, e.g., a printing service, provided by the device, e.g., printer 104. In one aspect of the invention, the advertisement message may be broadcast as part of an 802.11x or UWB beacon message. This broadcast may be included in OSI Layer 2 communications prior to establishing Layer 3 connectivity between the devices. The advertisement message may be encoded with information about the service provided by the device. For example, the advertisement message may include an IE, as discussed above.

In accordance with this embodiment, a device may advertise the services it provides as part of performing the method of FIG. 3, e.g., by not performing steps S302 and S304, and instead jumping to step S306. In step 306, one or more advertisement messages may be sent (without prompting by a request message) that include information related to one or more services provided by the device. The advertisement messages may be broadcast repeatedly. As one example, the advertisement message may be broadcast periodically.

In this embodiment, a wireless-enabled device 102 that passively determines available services may perform the method of FIG. 2 without performing step S202. That is, the device 102 may listen for service advertisement messages, and receive an advertisement message in step S204. Once wireless-enabled device 102 receives an advertisement message it may read the message to obtain the information about the service. Wireless-enabled device 102 may thus discover that a print service is available, provided by printer 104.

In step S206, the desirability of the advertised service may be determined. As one example, information related to the advertised service may be displayed for a user of wireless-enabled device 102. The user may decide whether to initiate a connection with the device that provides the advertised service. The desirability of the advertised service may be determined based on whether or not the user chooses to initiate a connection to take advantage of the service or other criteria.

As another example, information related to the advertised service may be examined by wireless-enabled device 102. The desirability of the service may be determined by comparing the characteristics of the service with one or more criteria. Wireless-enabled device 102 may be programmed to connect to devices that advertise services with particular characteristics, e.g., to synchronize with a particular type of PDA. Any suitable criteria could be used for determining the desirability of a particular service.

The methods shown in FIGS. 2 and 3 may include additional steps, as will be illustrated in the following embodiment.

In another embodiment of the invention, service discovery may be provided by enabling both active searching for services, and unprompted advertisement of services to allow devices to passively identify them. For example, a device that requires a particular service may repeatedly send request messages, and a device that provides a service may repeatedly send advertisement messages to advertise its services. Enabling both searching for services and advertisement of services may allow either the device that requests the service or the device that provides the service to send information to the other device.

In one aspect of the invention, if both searching for services and advertisement of services (active and passive service discovery) are enabled, the advertisement of services messages may include less information about the service than a response message. For example, a truncated IE may be sent by those devices advertising their service(s) which contains less information than a full-sized IE. Advertising services by sending truncated IEs may reduce the overhead associated with repeated transmissions.

Figure 5:
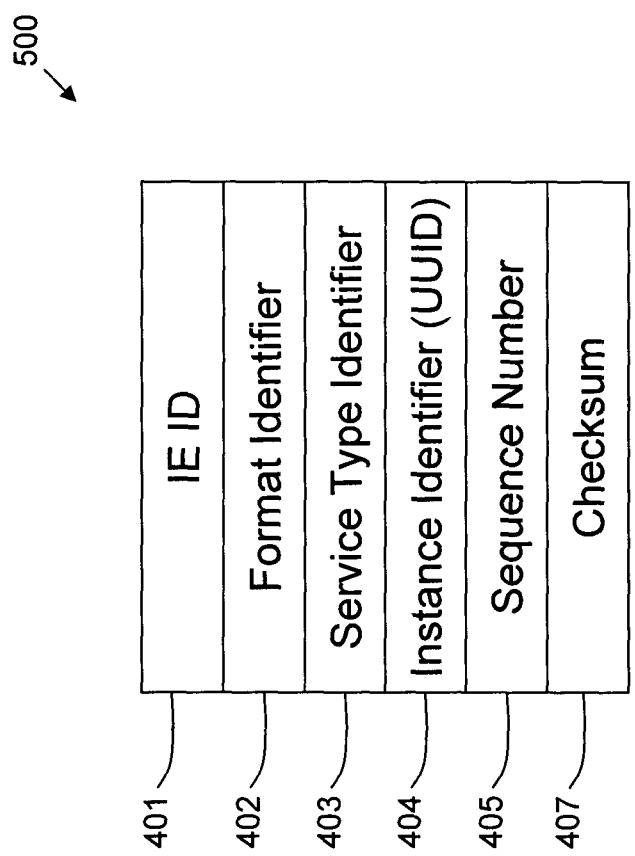
FIG. 5 is a diagram illustrating an example of a truncated information element.

FIG. 5 is a diagram illustrating an example of a truncated IE 500. Truncated IE 500 may include an IE ID 401, a format identifier 402, a service type identifier 403, an instance identifier (UUID) 404, a sequence number 405 and a checksum 407. These portions of the truncated IE may be similar to the corresponding portions of a full IE. Some portions of the truncated IE may be compressed using any suitable hash function.

As one example, a device providing a service may send advertisement messages with a shortened IE, and a wireless-enabled device 102 may receive them. For example, the IE may advertise that a device provides printing services, but may not include further detail about the printing services.

If wireless-enabled device 102 seeks more information about the service, it may then send a request message (e.g., relating to step S202 or S302) which may be similar to the request message discussed above, and the steps previously described with respect to methods 200 and 300 may be performed.

In response to receiving the request, the service providing device may send a full-size IE, for example, in a response message as discussed above (e.g., relating to step S204 or S306). Once the response message is received, the wireless-enabled device may establish a connection to the device as discussed above (e.g., relating to step S208 or S308).

In one aspect of the invention, the proximity 116 of the wireless-enabled device 102 may not necessarily be defined by the radio range of wireless-enabled device 102. As one example, the devices may take advantage of additional mechanisms provided by the wireless protocol, e.g., UWB, for determining the distance between the devices. Thus, the proximity 116 of the wireless-enabled device 102 may be limited to a smaller range than the radio range. Limiting the range at which services can be discovered may provide various benefits. For example, reducing the range may provide increased security by making it more difficult for communications to be intercepted by unintended recipients.

As used herein, the terms "received by a device," and "sent by a device" mean that the messages may be received and/or sent wirelessly by the device itself or by a device that is in communication with the device. The terms "received from a device" and "sent from a device" mean that the messages may be received and/or sent wirelessly by the device itself or by a device that is in communication with the device. For example, a device 102 may send wireless request messages by communicating by wire with a WLAN access point or other device that may send a wireless request message on behalf of the device 102.

In another embodiment, a user may desire to use a service provided by a device that does not itself have wireless capabilities, e.g., speaker system 112. In one aspect of the invention, discovery of services may be provided for service(s) provided by a device that does not have wireless capabilities. For example, speaker system 112 may be in the proximity 116 of wireless-enabled device 102, but may not be equipped to communicate wirelessly with wireless-enabled device 102 without a connection to another device, e.g., access point 112. Speaker system 112 may be connected to access point 110 via another type of connection, such as a wired connection.

A discovery of services announcement may be provided for the speaker system 112 by the access point 110. For example, the exchange of messages may proceed in a similar manner as discussed in the above embodiments, however, wireless-enabled device 102 may communicate wirelessly with the speaker system 112 via access point 110 rather than directly with the speaker system 112. Access point 110 may receive messages from wireless-enabled device 102 and send the messages to the device, e.g., speaker system 112, via a different type of connection, e.g., a wired connection. Access point 110 may receive messages from the device that provides the service, e.g., speaker system 112, and send the messages wirelessly to wireless-enabled device 102. Thus, access point 110 may convert messages from one format into another format and forward messages to their destinations in the appropriate medium, e.g., wired or wireless.

In one aspect of the invention, access point 110 or another device may maintain a list of devices in the proximity of the access point 110, e.g., printers in the proximity of the access point. The devices may be connected to the access point via wired connection. If services are advertised, access point 110 may send radio messages advertising services for devices that are on the list. If a wireless-enabled device 102 actively searches for a particular service, the request message may be sent via the access point by a wired connection to an appropriate device on the list. A response message may then be sent via the wired connection and transmitted wirelessly from the access point to the requesting device.

In another aspect of the invention, wireless-enabled device 102 may access wired network 114 via access point 110. Access point 110 may exchange radio messages with wireless-enabled device 102 to enable discovery of the services that may be provided by the network 114 via the access point 110. Discovery of the wired network services may be provided using any suitable technique discussed above.

Discovery of services may also be provided for a device 102 that is not wireless-enabled. For example, a desktop computer may be connected to access point 110 via a wired connection. The desktop computer may discover services in the proximity by communicating with access point 110. By communicating with access point 110, the desktop computer may discover services provided by wireless devices such as printer 104, camera 106 and PDA 108. For example, the exchange of messages may proceed using any of the techniques discussed above, however, the wireless devices may communicate wirelessly with access point 110 rather than directly with the device that is not wireless-enabled, e.g., the desktop computer.

Figure 6:
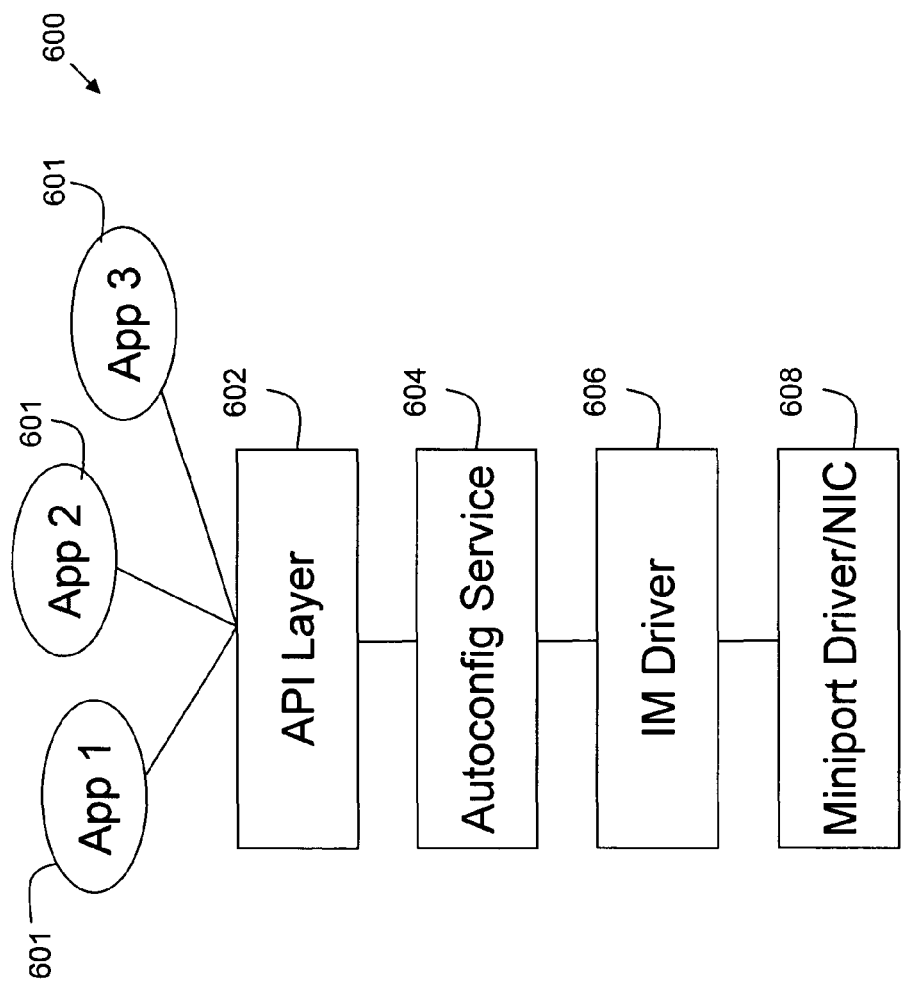
FIG. 6 is a block diagram illustrating an example of a distribution of functional entities that may be used for implementing aspects of a proximity service discovery system.

FIG. 6 illustrates an example of a distribution of functional entities 600 of a proximity service discovery system. However, this distribution of functionality and the choice of entities are chosen merely by way of example, and may be different in other embodiments.

The architecture includes four functional entities: MiniPort Driver/NIC 608, IM Driver 606, Autoconfig Service 604, and API Layer 602. The MiniPort Driver and NIC 608 may interface with the IM Driver 606. The IM driver 606 may interface with the Autoconfig Service 604. The Autoconfig Service 604 may interface with the API Layer 604. One or more applications 601 may interface with the API layer.

On the device that provides a service, applications may register a specific service IE corresponding to their service identification with the API layer 602. The API layer 602 may be able to aggregate multiple IEs from different applications to form a train of IEs. Since the duration of an advertisement message (e.g., beacon) may be limited, the API layer 602 may ensure that all IEs fit within the advertisement message. Additional requests to add an IE may be rejected by the API layer 602 if they would exceed the maximum advertisement or request message duration. Applications 601 may also de-register an IE. The API layer 602 may perform application monitoring, i.e. if applications 601 close without de-registering the IE, the API layer 602 may remove the corresponding IEs from the aggregate list. It may do this by keeping an open handle to the application 601 upon registration. The Autoconfig service 604 may be responsible for the connection management, i.e. association, authentication, creating and joining and an ad hoc network.

In embodiments in which searching for particular services is enabled, the device that provides the service may be a member of a network already or passively listening to requests. The device may be transmitting and receiving on a preferred channel or select any free channel in accordance with the regulatory requirements that apply to the geographic location in which the station operates. The IM driver 606 may receive request messages forwarded from the Miniport/NIC 608. The IM driver 606 may subsequently match the service IE contained in the probe request with the services registered. Upon match, the IM driver 606 may return the probe response containing the corresponding full service IE that matches the service IE previously registered by one of the applications/services. Due to the timing requirements between probe request and probe response, the matching operation may be performed in real time and thus may not involve process switching delays.

In embodiments in which services are advertised, the Autoconfig Service 604 may create or join an ad-hoc network after an IE is registered. The IM driver 606 may configure the beacon that is subsequently sent out by the MiniPort/NIC following the medium access rules for the selected mode of operation, i.e. ad hoc, or infrastructure. Any addition or removal of an IE at the API layer 602 may result in an update of the beacon.

On the device that requires a service (e.g., client device), applications 601 interested in services provided in the proximity may register IEs at the API layer 602 corresponding to the services they are interested in. IEs may contain wildcards or be left blank in case the application is interested in multiple or all services within the proximity.

If searching for services is enabled, the client device may periodically send requests messages (e.g., probe messages) to discover the existence of services it is interested in. Once a service is discovered and a connection is established, the API layer 602 may instruct the IM driver 606 to stop probing for this service. To reduce the overhead associated with "blind" probing, the IM Driver 606 may instruct the Miniport driver 608 to send out probe requests only if networks are detected.

Service IEs that are associated with a network may be passed to the API layer 602 following channel scans while listening for advertisement messages. The device may monitor each channel for a certain period of time. If an IE is received, the IE may be filtered out and passed to the API layer 602. The API layer 602 may subsequently notify applications 601 that have registered a matching service request.

Particular implementation details of computer systems that may execute aspects of the invention will now be described. These implementation details are provided by way of example only, and the invention is not limited to any particular implementation.

Methods described herein, acts thereof and various embodiments and variations of these methods and acts, individually or in combination, may be defined by computer-readable messages tangibly embodied on or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data message such as a carrier wave or other transport mechanism and includes any information delivery media. The term "modulated data message" means a message that has one or more of its characteristics set or changed in such a manner as to encode information in the message. By way of example, and not limitation, communication media includes wired media such as a wired network or direct-wired connection, wireless media such as acoustic, RF, infrared and other wireless media, other types of communication media, and any suitable combination of the foregoing.

Computer-readable messages embodied on one or more computer-readable media may define instructions, for example, as part of one or more programs that, as a result of being executed by a computer, instruct the computer to perform one or more of the functions described herein, and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems described herein, may be distributed across one or more of such components, and may be in transition therebetween. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

The computer-readable media may be transportable such that the instructions stored thereon can be loaded onto any suitable computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, or any other type of processor. Further, the embodiments may be located on a single computer or may be distributed among a plurality of computers attached by a communications network. Such a processor usually executes an operating system which may be, for example, the Windows® 95, Windows® 98, Windows NT®, Windows® 2000 (Windows® ME) or Windows® XP operating systems available from Microsoft Corporation, MAC OS System X available from Apple Computer, the Solaris Operating System available from Sun Microsystems, UNIX available from various sources or Linux available from various sources. Many other operating systems may be used.

For example, various aspects of the invention may be implemented as specialized software executing in a general-purpose computer system. The computer system may include a processor connected to one or more memory devices, such as a disk drive, memory, or other device for storing data. Memory is typically used for storing programs and data during operation of the computer system. Components of the computer system may be coupled by an interconnection mechanism, which may include one or more busses (e.g., between components that are integrated within a same machine) and/or a network (e.g., between components that reside on separate discrete machines). The interconnection mechanism enables communications (e.g., data, instructions) to be exchanged between system components. The computer system also includes one or more input devices, for example, a keyboard, mouse, trackball, microphone, touch screen, and one or more output devices, for example, a printing device, display screen, speaker. In addition, the computer system may contain one or more interfaces that connect the computer system to a communication network (in addition or as an alternative to the interconnection mechanism.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

Network 114 may be any suitable type of network such a local area network (LAN), wide area network (WAN), intranet, Internet or any combination thereof. For illustrative purposes, a limited number of devices are shown in this example. The devices may be coupled to the network through one or more servers, routers, proxies, gateways, network address translation devices or any suitable combination thereof.

It should be appreciated that the invention is not limited to executing on any particular system or group of systems. Also, it should be appreciated that the invention is not limited to any particular distributed architecture, network, or communication protocol.

Having now described some embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. The foregoing description and drawings are by way of example only. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. The use of "including," "comprising," or "having," "containing," "involving," and variations thereof herein, is meant to encompass the items listed thereafter and equivalents thereof as well as additional items.

What is claimed is:

1. A method of accessing, by a first device, a service provided by a second device that is in a proximity of the first device, the method comprising:
   prior to establishing a connection between the first device and the second device that is suitable for providing the service:
      broadcasting, by the first device, a wireless request message to one or more devices in the proximity of the first device, wherein the wireless request message requests a first service and comprises a first service information element including information about the requested first service, wherein the first service information element is registered on the first device, and wherein the one or more devices includes the second device;
      receiving a wireless response message from the second device, wherein the wireless response message comprises a second service information element, the second service information element comprising information pertaining to the requested first service provided by the second device, wherein the second service information element is shortened, the shortened second service information element comprising a format identifier, and wherein the format identifier is compressed using a hash function;
      determining, based on the wireless response message, whether the second device provides the requested first service, wherein the determining comprises comparing at least one field of the second service information element with at least one field of the first service information element; and
      establishing a connection between the first device and the second device, if the second device provides the requested first service.

2. The method of claim 1, wherein the broadcasting of the wireless request message comprises sending the wireless request message by a device in communication with the first device.

3. The method of claim 1, wherein the wireless request message is sent in accordance with the 802.11 or Ultrawideband protocol by the first device.

4. The method of claim 3, wherein the wireless request message is sent as at least a portion of an 802.11 probe message.

5. The method of claim 1, further comprising:
   providing, to a user of the first device, on a human perceptible medium, the information pertaining to the requested first service if the second device provides the requested first service.

6. The method of claim 1, wherein the proximity of the first device is defined at least partially by a wireless range of the first device.

7. The method of claim 1, further comprising:
   limiting the proximity of the first device to a region smaller than a region defined by a wireless range of the first device.

8. The method of claim 1, further comprising receiving an authentication request from the second device prior to establishing the connection.

9. The method of claim 1, further comprising obtaining the requested first service from the second device.

10. A computer-readable storage device storing computer-executable instructions for performing steps comprising:
   prior to establishing a connection between a first device and a second device that is suitable for providing a requested service:

broadcasting, by the first device, a wireless request message to one or more devices in the proximity of the first device, wherein the wireless request message requests a first service and comprises a first service information element including information about the requested first service, wherein the first service information element is registered on the first device, and wherein the one or more devices includes the second device;

receiving, from the second device, a wireless response message, wherein the wireless response message comprises a second service information element, the second service information element comprising information pertaining to the requested first service provided by the second device, wherein the second service information element is shortened, the shortened second service information element comprising a format identifier, and wherein the format identifier is compressed using a hash function;

determining, based on the wireless response message, whether the second device provides the requested first service, wherein the determining comprises comparing at least one field of the second service information element with at least one field of the first service information element; and establishing a connection between the first device and the second device, if the second device provides the requested first service.

11. The computer-readable storage device of claim 10, wherein the broadcasting of the wireless request message comprises sending the wireless request message from a device in communication with the first device.

12. The computer-readable storage device of claim 10, wherein the wireless request message is sent wirelessly in accordance with the 802.11 or Ultrawideband protocol by the first device.

13. The computer-readable storage device of claim 12, wherein the wireless request message is sent as at least a portion of an 802.11 probe message.

14. The computer-readable storage device of claim 10, further storing computer-executable instructions for performing a step comprising:
providing, to a user of the first device, on a human perceptible medium, the information pertaining to the requested first service if the second device provides the requested first service.

15. The computer-readable storage device of claim 10, further storing computer-executable instructions for performing a step comprising:
limiting the proximity of the first device to a region smaller than a region defined by a wireless range of the first device.

16. The computer-readable storage device of claim 10, further storing computer-executable instructions for performing a step comprising:
receiving an authentication request from the second device prior to establishing the connection.

17. The computer-readable storage device of claim 10, further storing computer-executable instructions for performing a step comprising:
obtaining the requested first service from the second device.

18. A system including:
at least one processor of a second device and a memory operatively connected to the at least one processor and including instructions that, when executed by the at least one processor, perform a method, the method comprising:
prior to establishing a connection between a first device and the second device that is suitable for providing a service, wherein the second device is in the proximity of the first device:
receiving, at the second device and from the first device, a wireless request message, wherein the wireless request message requests a first service and comprises a first service information element including information about the requested first service, and wherein the first service information element is registered on the first device;
sending, by the second device, a wireless response message to the first device, wherein the wireless response message comprises a second service information element, the second service information element comprising information pertaining to the requested first service provided by the second device, wherein the second service information element is shortened, the shortened second service information element comprising a format identifier, and wherein the format identifier is compressed using a hash function; and
establishing a connection between the first device and the second device, if the second device provides the requested first service and in response to a connection request from the first device.

19. The system of claim 18, wherein the sending of the wireless response message comprises sending the wireless response message by a device in communication with the second device.

20. The system of claim 18, wherein the receiving of the wireless request message from the first device comprises receiving the wireless request message from a device in communication with the first device.

* * * * *